United States Patent
Mastenbrook

[11] Patent Number: 6,002,422
[45] Date of Patent: Dec. 14, 1999

[54] METHOD FOR SIGNAL LEVEL MONITORING

[75] Inventor: Gary E. Mastenbrook, Schaumburg, Ill.

[73] Assignee: Motorola, Inc., Schaumburg, Ill.

[21] Appl. No.: 08/778,992

[22] Filed: Jan. 6, 1997

[51] Int. Cl.[6] .............................. H04N 7/16; H04N 7/173; H04N 7/10
[52] U.S. Cl. ...................... 348/6; 348/7; 348/1; 348/13; 348/180; 455/3.1; 455/6.1; 455/4.2; 455/5.1
[58] Field of Search .................. 348/6, 7, 1, 13, 348/180, 192, 193; 455/3.1, 6.1, 4.2, 5.1; H04N 7/16, 7/173, 7/10

[56] References Cited

U.S. PATENT DOCUMENTS

| | | | |
|---|---|---|---|
| 4,207,431 | 6/1980 | McVoy | 348/180 |
| 4,238,766 | 12/1980 | Masuda | 455/6.1 |
| 4,648,123 | 3/1987 | Schrock | 348/9 |
| 4,707,832 | 11/1987 | Glenn et al. | 370/124 |
| 4,910,791 | 3/1990 | Dickinson et al. | 348/6 |
| 5,585,842 | 12/1996 | Chappell et al. | 348/192 |
| 5,635,980 | 6/1997 | Lin et al. | 348/13 |
| 5,712,897 | 1/1998 | Ortel | 348/180 |
| 5,805,202 | 9/1998 | Mullins et al. | 348/6 |
| 5,808,671 | 9/1998 | Maycock et al. | 348/180 |

*Primary Examiner*—John K. Peng
*Assistant Examiner*—Linus H. Lo
*Attorney, Agent, or Firm*—Terri S. Hughes

[57] ABSTRACT

A cable access unit (CAU) (60) capable of monitoring power levels for a plurality of channels couples a television (80) and communication equipment (70) to an operations and maintenance center (OMC) (20). At some determined interval, the OMC (20) determines the need to measure the television signal at some particular subscriber's location and sends a message to the CAU (60). The CAU (60) determines if the communications equipment is in use. If not, the CAU receiver is tuned to the channel, and samples and digitizes the power level. The digitized power level is assembled into a message packet and transmitted to the OMC (20).

9 Claims, 2 Drawing Sheets

METHOD FOR SIGNAL LEVEL MONITORING

BACKGROUND OF THE INVENTION

In a cable television network, a plurality of televisions are connected by way of a coaxial cable network to a centralized facility which generates the television signals within the CATV (cable television) network. This network is typically controlled by a operations center (OC) located at the head-end site. The OC controls the CATV network to provide a standard predictable grade of television service. Generally, each television is connected to the cable at different locations.

The headend television equipment transmits signals to the televisions at a pre-determined power level. However, because the televisions are not at the same location, the power level of the received signal may be different at each television due to variations in the distribution path and associated component loses. There could also be variations in the power level from one television channel to the next resulting from improper slope adjustment or other distribution channel anomalies.

In certain situations, the signal power level might be adequate for one television for one channel, while the power level for the same or a different television channel at a different location might not be adequate.

These level variations can result form temperature changes, equipment degradation or water intrusion into the coaxial cable itself. Further, these problems could occur at any place along the distribution network.

The present method of detecting problems with power level is based on the user of the television monitoring the station quality. Whenever the quality deteriorates sufficiently, it is assumed that the television user will contact the operator of the cable television network.

There are several obvious problems with such an approach. For example, the system requires that the user experience some difficulty with the television prior to contacting the operator. The operator also can not determine whether the problem is local to the user or global to the entire system without further testing.

Thus, an improved method for monitoring the power level would be highly advantageous.

DESCRIPTION OF THE PREFERRED EMBODIMENT

A system providing comprehensive monitoring of power levels has a cable access unit (CAU) 60 capable of monitoring power levels for a plurality of channels and an enhanced operations and maintenance center (OMC) 20. At some determined interval, the OMC 20 determines the need to measure the television signal at some particular subscriber's location and sends a message to the CAU 60. The CAU 60 determines if the telephone is in use. If not, the CAU 60 receiver is tuned to the channel, and samples and digitizes the power level. The digitized power level is assembled into a message packet and transmitted to the OMC 20.

The OMC 20 then will analyze the power level and may, dependent upon the power level, perform further tasks, such as issuing subsequent commands to other cable access units for a power level analysis or indicating an alarm to the operator of the cable system.

Figure 1:
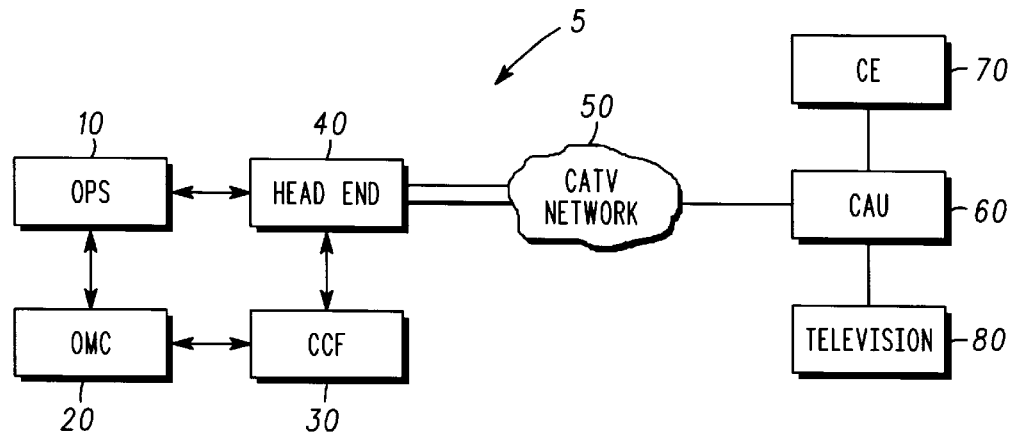
FIG. 1 shows a cable television network.

FIG. 1 shows a cable television network. The operations center (OPS) 10 controls the generation and distribution of the television signals within the overall CATV Network 50 and may be coupled to the OMC 20. The OPS 10 may also be connected to the OMC 20 if one is present. The OMC 20 typically controls the telephony or other services or systems of the enhanced CATV system. This includes specific individual components of the additional services such as CAU 60 units or cable control frame (CCF) 30 units or other remotely controllable elements of the system. Typically, control and monitoring of telephony or additional services system elements is controlled by an OMC 20 computer and software sub-system called an element manager (EM).

The OMC 20 is connected to the cable control frame (CCF) 30. The CCF 30 converts the telephony and additional services radio frequency signals within the cable system to digital telephony or other digital or analog signals for further processing by other standard telephony or network elements.

The CCF 30 is connected, in turn, to the head end 40. Equipment at the head end 40 generates or further processes the television signals, then combines the TV signals with the special services signals before putting them onto the hybrid fiber coax (HFC) network 50. This includes radio frequency filtering and level setting via amplification or attenuation elements within the head end 40 site. The radio frequency signal path between the special services equipment and the remote subscriber is typically two way, with downstream signals flowing from the head end 40 site to the remote subscriber location, and upstream signals originating at some remote subscriber location being relayed and received at the headend equipment for transferal to the CCF 30 equipment. After further processing at the CCF 30, received signals from the CAU 60 are transferred to the public switched telephone network (PSTN 90) or a private network which supports the services offered at the CAU 60.

Head end 40 is coupled by way of HFC network 50 to CAU 60. CAU 60 is connected to communication equipment (CE) 70 and television 80. CE 70 could be, for example, a telephone, a modem, a computer system interface.

Optionally a computer system interface may be supported by the CAU with the intent of providing a digital signal pathway between the CCF 30 and the subscriber's computer 100 system.

Figure 2:
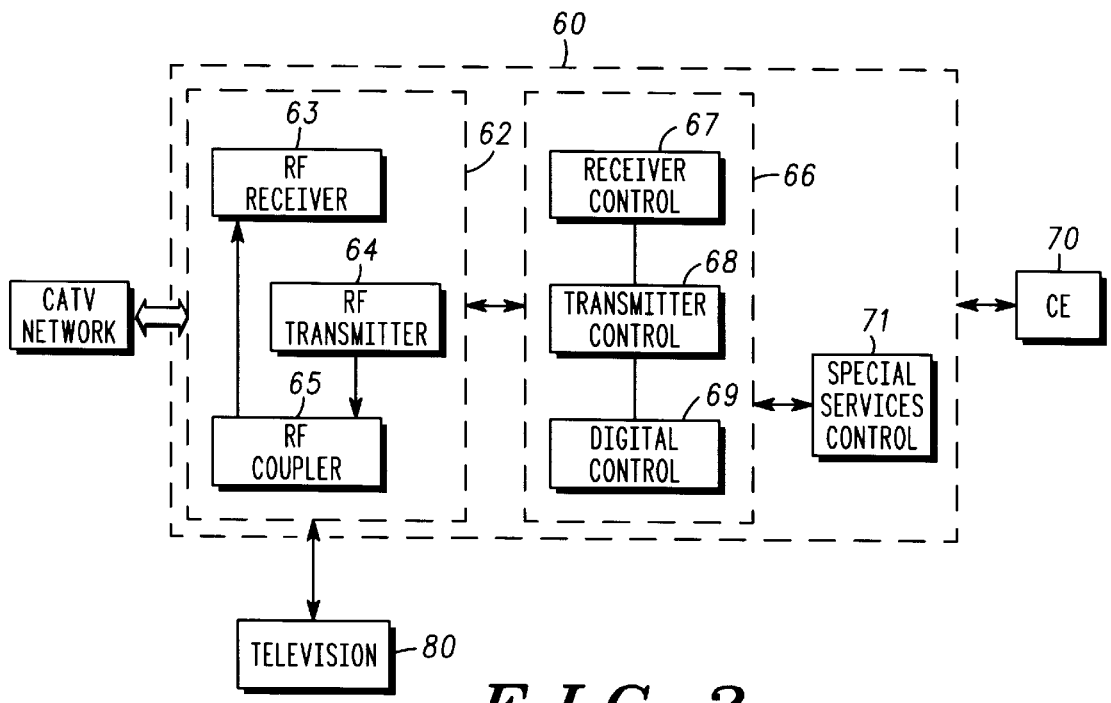
FIG. 2 shows a cable access unit.

FIG. 2 shows the CAU 60. CAU 60 consists of three major components. The RF (radio frequency) interface 62 connects to the CATV network 50. RF interface 62 receives and transmits special services signals such as telephony services in the protocol selected for the enhanced cable services network. RF interface 62 also passes through television signals for routing to the television 80.

RF Receiver and signal measuring device 63 receives the digitally modulated radio signals coupled from the enhanced cable services network and does frequency conversion and demodulation functions to allow the CAU to receive communications from the network. Another function of the subsection is to provide a RF signal strength indication which is used to determine and quantify the presence of RF signals in the downstream path RF Transmitter 64 performs modulation and frequency conversion functions to allow transmission of upstream messages from the CAU to the CCF over the enhanced cable services network.

RF Coupler 65 allows the CAU's receiver and transmitter access to the cable network without interfering with the standard downstream signals being delivered to the TV 80.

A processor 66 receives and generates messages from the OMC 20 via the CCF 30 at the headend. Processor 66 generated and receives appropriate to the type of services offered by the system.

Receiver control 67 sets the RF receiver to the appropriate downstream channel and controls the signal level measurement and demodulation functions of the receiver. Transmit control 68 sets the RF transmitter to the appropriate upstream channel and controls the modulation functions of the transmitter. Digital control 69 provides timing and control functions to allow the CAU to properly synchronize with and maintain communications with the network.

Special services control 71 allocates and enables the services to be provided to the subscriber and provides the appropriate interface and control characteristics (example: ISDN, FAX, POTS, modem, etc.) This may include providing loop current, off hook detection, ringing pulses and other telephone type control functions.

Interfaces may be used for different types of CE 70 such as telephones, facsimile machines and/or for computer equipment for high speed digital data communications interfacing into a personal computer system.

Figure 3:
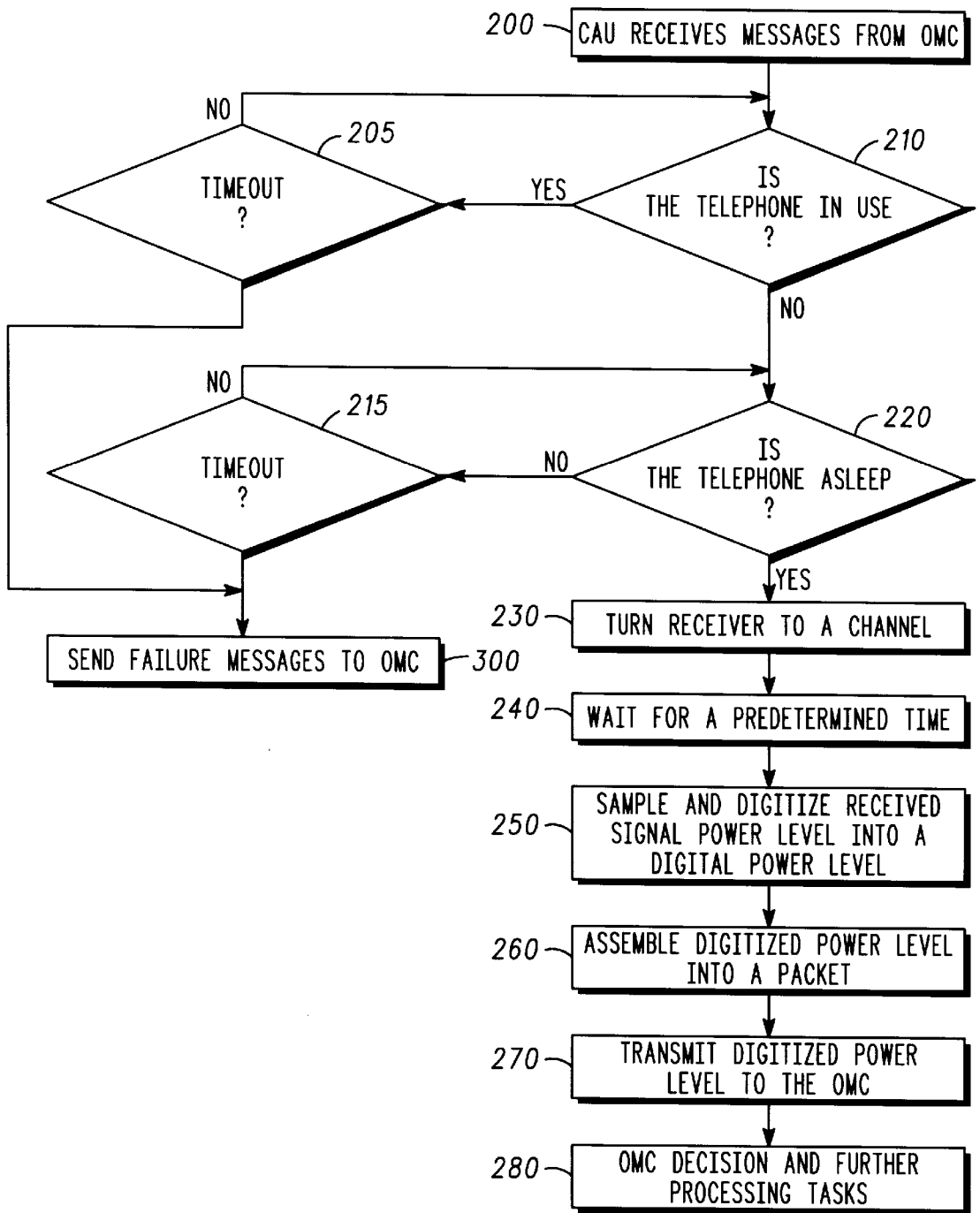
FIG. 3 is a flowchart showing operating of the signal level monitoring system.

FIG. 3 shows a flowchart for operation of the CAU. The CAU 60 receives a message from the OMC/EM 20 to perform a power level test (step 200). This message may contain information such as channel number to measure, number of requested measurements or averaging number if multiple measurements are requested, or a range of channels to measure and report differences or some other calculated result.

The CAU 60 then checks if the CE 70 is in use (step 210). If the CE 70 is not in use, then the CAU checks if the CE 70 is "asleep" (step 220). A telephone is "asleep" when the unit is on-hook and not drawing loop current, not being supplied ring signals, or otherwise engaged in communications to or from the network.

In either step 210 or step 220, there is a possibility of the delay being excessive and interrupting service to the additional services subscriber. In such a case, a time-out occurs (steps 205, 215), and a negative acknowledgment message is sent to the OMC 20 (step 300). The system would typically then try again at some later time.

If the CE 70 is asleep, the CAU 60 tunes the receiver to the channel requested by the OMC 20 or to a preset channel (step 230). The CAU 60 then waits for a predetermined time (step 240), which could range from several microseconds to as long as several seconds. This allows the measurement sub-system to settle and provide a stable signal for measurement.

The CAU 60 then samples and digitizes the receive signal power level of the cable television signal into a digitized power level (step 250). This might be a single measurement or multiple measurement process depending on the setting of system parameters. A single or multiple averaged measurement is then determined to be the power level at the measured channel. The digitized power level is then assembled into a packet (step 260) and transmitted to the OMC 20 (step 270).

Upon receipt of the packet, the OMC 20 then processes the response depending on which type of information it has received (step 280). If the information is for a channel not previously measured by the CAU 60, a new measurement table entry or file is created for reference in future measurement situations. If the information is for a channel previously measured by the CAU 60, a comparison is made between the new and old measurements with additional measurement requests being generated or alarm conditions being set for out of range measurement results.

I claim:

1. In a cable television (CATV) network having a two-way hybrid fiber coaxial (HFC) cable for upstream and downstream communications where a CAU (cable access unit) located at a subscriber location, having a CAU receiver, is coupled to an OMC (operations and maintenance center) remotely located from the subscriber location, and where the CAU is in communication with the OMC by way of the CATV network and upstream communication equipment is coupled to the OMC by way of the CAU, a method of monitoring a power level of a cable television signal comprising the steps of:

at the CAU:
   receiving an downstream message across the two-way HFC cable to perform a power level test;
   determining that the upstream communication equipment is asleep; and
   when the upstream communication equipment is asleep:
   tuning the CAU receiver to a channel;
   sampling and digitizing the power level of the cable television signal within the channel to create a digitized power level; and
   transmitting the digitized power level to the OMC upstream across the two-way HFC cable; and
   at the OMC:
   comparing the digitized power level with a previously stored digitized power level; and
   determining a quality of the of the cable television signal based on the step of comparing.

2. The method of claim 1 further comprising the step of assembling the digitized power level into a packet.

3. The method of claim 2 further comprising the step of decoding the packet at the OMC.

4. The method of claim 3 further comprising the step of, at the OMC, storing the digitized power level.

5. The method of claim 4 further comprising the step of, at the OMC, generating an alarm signal if the difference between the digitized power level and the previously stored digitized power level exceeds a threshold.

6. The method of claim 1 where the step of tuning the CAU receiver to a channel includes the step of retrieving a test channel from a memory.

7. The method of claim 1 where the step of tuning the CAU receiver to a channel includes the step of retrieving a test channel from the message.

8. The method of claim 1 including the step of generating, by the OMC, a power level test message.

9. In a cable television network having a two-way hybrid fiber coaxial (HFC) cable for upstream and downstream communications where a CAU (cable access unit) located at a subscriber location, having a CAU receiver, is coupled to an OMC (operations and maintenance center) remotely located from the subscriber location, and where the CAU is in communication with the OMC by way of the CATV network and upstream communication equipment is coupled to the OMC by way of the CAU, a method of monitoring a power level of a cable television signal comprising the steps of:

at the CAU:
   receiving a downstream message across the two-way HFC cable to perform a power level test;

determining that the upstream communication equipment is asleep; and when the upstream communication equipment is asleep:

tuning the CAU receiver to a channel;

sampling and digitizing the power level of the cable television signal within the channel in order to create a digitized power level;

assembling the digitized power level into a packet; and transmitting the packet upstream across the two-way HFC cable to the OMC;

at the OMC:

decoding the packet;

storing the digitized power level;

comparing the digitized power level with a previously stored digitized power level; and generating an alarm signal if the difference between the digitized power level and the previously stored digitized power level exceeds a threshold.

\* \* \* \* \*